(No Model.)
J. HUGHES.
SAFETY VALVE.
No. 391,472. Patented Oct. 23, 1888.
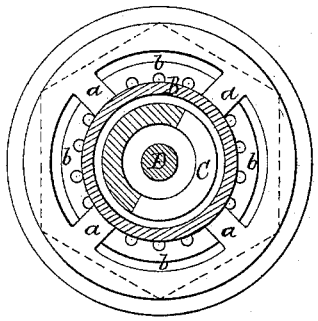
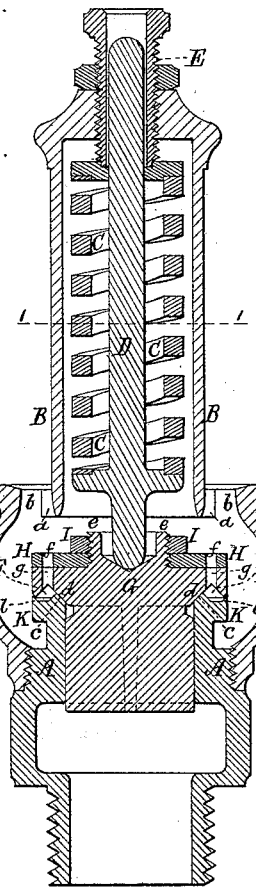
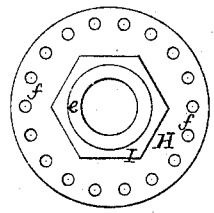
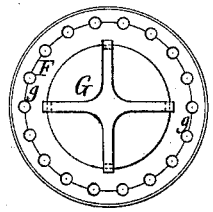
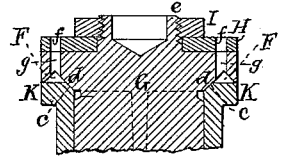
Witnesses.
A. F. Piper.
W. E. Piper.
Inventor.
John Hughes,
by Singleton & Piper, atty's.

UNITED STATES PATENT OFFICE.

JOHN HUGHES, OF SOMERVILLE, ASSIGNOR TO THE CROSBY STEAM GAGE AND VALVE COMPANY, OF BOSTON, MASSACHUSETTS.

SAFETY-VALVE.

SPECIFICATION forming part of Letters Patent No. 391,472, dated October 23, 1888.

Application filed June 20, 1888. Serial No. 277,672. (No model.)

*To all whom it may concern:*

Be it known that I, JOHN HUGHES, a citizen of the United States, residing at Somerville, in the county of Middlesex and State of Massachusetts, have invented certain new and useful Improvements in Safety-Valves for Steam-Boilers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a vertical and median section of a safety-valve provided with my invention. Fig. 2 is a horizontal section of the same on line 1 1 of Fig. 1. Fig. 3 is a top view, and Fig. 4 an under side view, of the valve. Fig. 5 shows a modification.

The nature of my invention is defined in the claims hereinafter presented.

In the drawings, A denotes the body of the valve, to which is secured the valve and spring-case B, the lower portion or valve-chamber being connected with the spring-case by arms $a$, having openings $b$ between them. Said openings are to allow steam to escape from the valve-chamber. The body of the valve is provided at its upper end with a seat, $c$, the valve G being correspondingly shaped, as shown at $d$, to rest on such seat, and is held down thereupon against the pressure of the steam by a spring, C, arranged on a spindle, D, in the usual manner, the pressure on the spring being varied when required by the screw-bolt E at the top of the spring-case.

The seat $d$ of the valve forms one side of a chamber, F, arranged in the under side of the said valve, as shown, and extending underneath and forming a bottoming for the said chamber F, and also a part of the body of the valve, is a flange, K, having at its outer edge and projecting upward therefrom an inclined lip, $l$, which nearly touches the outer edge of the valve G, as shown.

The step for the foot of the spindle I arrange in a projection, $e$, extended upward from the top of the valve, and provide said projection with a screw-thread to receive a thin nut or register, H, and a check-nut, I, as shown. Extending through the nut or register H and the top of the valve and into the chamber F are two series of small holes, $f$ and $g$, the holes $f$ in the nut being arranged to coincide with the holes $g$ in the valve when the said nut is screwed down upon its seat.

When the valve is closed on its seat, the lower face only of said valve is exposed to the pressure of the steam; but when such pressure exceeds the resistance of the spring by which the valve is held down upon its seat, said valve will rise slightly, and the steam, escaping between the same and its seat, will act within the chamber F and assist the escaping steam to lift the valve higher.

Should it be desired to cause the valve G to rise higher above its seat than it will when the holes $f$ in the nut coincide with the holes $g$ in the valve, by introducing a pointed instrument through one of the openings $b$ in the case and into one of the holes $f$ in the nut, and striking said instrument a sudden blow with a hammer or other implement, the nut can be turned more or less on its axis, and the openings between the nut and valve reduced in size to give to the valve a larger area for the steam to act upon to lift the said valve to a greater extent, as may be required.

Thus it will be seen that with my invention I am enabled to increase or diminish the area of surface of the valve to a greater or less extent, as may be required to utilize to the best advantage the steam which shall escape between the valve and its seat and act within the chamber F.

My invention is intended more particularly for valves of small size; but it can be used with equally as good results on larger ones, and affords a very efficient and convenient means for regulating the pressure of the steam within the chamber F.

I claim—

1. The combination of the valve-body having at its top the valve-seat $c$, the flange K, and lip $l$, with the valve provided with the chamber F and openings $g$, as shown, and the nut or register H, having the openings $f$ and the check-nut I, said nuts being screwed on a projection from the top of the valve, all as shown, and for the purpose substantially as described.

2. The combination of the valve-body provided with the valve-seat and flange K at its top with the valve having the chamber F, openings g, and projection e, said projection being screw-threaded to receive the nut I and the nut or register H, all as shown, and for the purpose substantially as described.

3. The combination of the valve-body provided with the valve-seat and flange, as described, and the valve G, having the chamber F, openings g, and projection e, the latter being screw-threaded to receive the nut or register H and the check-nut I, said nut or register having openings, as shown, with the valve and spring-case B, provided with the arms a and openings b, screw-bolt E, spindle D, and spring C, all as shown, and to operate substantially as set forth.

4. The valve-body provided with the valve-seat and flange or bottoming K, in combination with the valve having the chamber F, openings g, and projection e, and the register H, applied to said projection so that it can be turned thereon to regulate the flow of steam through the openings f and g and be confined in position by the nut I, substantially as shown and described.

In testimony whereof I affix my signature in presence of two witnesses.

JOHN HUGHES.

Witnesses:
S. N. PIPER,
ALBERT A. MEADE.